United States Patent

Yano et al.

[11] Patent Number: 6,077,625
[45] Date of Patent: Jun. 20, 2000

[54] NON-SINTERED NICKEL ELECTRODE FOR ALKALINE STORAGE BATTERY

[75] Inventors: Mutsumi Yano, Hirakata; Mitsunori Tokuda, Osaka; Kousuke Satoguchi, Tokushima; Shin Fujitani; Koji Nishio, both of Hirakata, all of Japan

[73] Assignee: Sanyo Electric Co., Ltd., Osaka, Japan

[21] Appl. No.: 09/097,679

[22] Filed: Jun. 16, 1998

[30] Foreign Application Priority Data

Jun. 16, 1997 [JP] Japan .................................. 9-176314
Jun. 16, 1997 [JP] Japan .................................. 9-176315

[51] Int. Cl.$^7$ ................................................... H01M 4/32
[52] U.S. Cl. ..................... 429/223; 429/59; 429/218.2; 204/290 R
[58] Field of Search .................... 429/223, 59, 218.2; 204/290 R

[56] References Cited

U.S. PATENT DOCUMENTS

| 777,417 | 6/1957 | Winkler . | |
|---|---|---|---|
| 5,466,543 | 11/1995 | Ikoma et al. | 429/59 |
| 5,861,225 | 1/1999 | Corrigan et al. | 429/223 |

FOREIGN PATENT DOCUMENTS

| 0587973A1 | 3/1994 | European Pat. Off. . |
|---|---|---|
| 058797A1 | 3/1994 | European Pat. Off. . |
| 0757395A1 | 2/1997 | European Pat. Off. . |
| 62-234867 | 10/1987 | Japan . |
| 1-272050 | 10/1989 | Japan . |
| 3-078965 | 4/1991 | Japan . |
| 5-028992 | 2/1993 | Japan . |
| WO 9614666A1 | 5/1996 | WIPO . |

*Primary Examiner*—Bruce F. Bell
*Attorney, Agent, or Firm*—Birch, Stewart, Kolasch & Birch, LLP

[57] ABSTRACT

Non-sintered nickel electrodes for alkaline storage batteries which can express high active material utilization efficiency not only at the time of charging at ordinary temperature but also at the time of charging in a high-temperature atmosphere are provided by using an active material powder composed of composite particles each comprising a substrate particle containing nickel hydroxide, an inner coat layer covering the substrate particle and comprising yttrium, scandium or a lanthanoid, or an yttrium, scandium or lanthanoid compound, and an outer coat layer covering the inner coat layer and comprising cobalt or a cobalt compound, or composed of composite particles each comprising a substrate particle containing nickel hydroxide, an inner coat layer covering the substrate particle and comprising cobalt or a cobalt compound, and an outer coat layer covering the inner coat layer and comprising yttrium, scandium or a lanthanoid, or an yttrium, scandium or lanthanoid compound.

22 Claims, 6 Drawing Sheets

NON-SINTERED NICKEL ELECTRODE FOR ALKALINE STORAGE BATTERY

BACKGROUND OF THE INVENTION

This application claims the priority of Japanese Patent Applications Nos. H09-176314 and H09-176315, both filed on Jun. 16, 1997.

1. Field of the Invention

The present invention relates to a non-sintered nickel electrode for an alkaline storage battery and, more particularly, to an improvement in the active material with the aim of providing a non-sintered nickel electrode for an alkaline storage battery with which high active material utilization efficiency can be achieved not only in charging at ordinary temperature but also in charging in an elevated temperature atmosphere.

2. Prior Art

Sintered nickel electrodes produced by impregnating, with an active material (nickel hydroxide), sintered base plates obtained by sintering a nickel powder on perforated steel plates or the like are well known in the art as positive electrodes for use in nickel-hydrogen storage batteries, nickel-cadmium storage batteries and the like.

For increasing the rate of packing or filling of an active material in sintered nickel electrodes, it is necessary to use sintered base plates with a high porosity. Since, however, the interparticle bond resulting from sintering of nickel particles is weak, an increase in porosity of sintered base plates results in a tendency toward nickel particles falling away from the sintered plates. Practically, therefore, it is impossible to increase the porosity of sintered base plates to a level higher than 80%. Sintered nickel electrodes thus have a problem in that the rate of active material packing is low. There is another problem. Namely, since the pore size of sintered bodies from a nickel powder is generally small, say 10 $\mu$m or less, it is necessary to effect the packing of sintered base plates with an active material by repeating several times the step of impregnation, which is complicated.

For such reasons, non-sintered nickel electrodes have recently been proposed. The non-sintered nickel electrodes are produced by packing or filling base plates having a high porosity with a kneaded mixture (paste) of an active material (nickel hydroxide) and a binder (e.g. aqueous solution of methyl cellulose). In the case of non-sintered nickel electrodes, base plates with a high porosity can be used (base plates with a porosity of 95% or more can be used), so that the rate of active material packing can be increased. Furthermore, the active material packing into base plates is easy.

However, when base plates having a high porosity are used for increasing the rate of active material packing in non-sintered nickel electrodes, the current collecting property of the base plates is worsened, hence the active material utilization efficiency decreases.

Therefore, for increasing the active material utilization efficiency in non-sintered nickel electrodes, it has been proposed to use, as an active material, composite particles prepared by forming a coat layer consisting of cobalt hydroxide on the surface of nickel hydroxide particles, or composite particles prepared by forming a cobalt oxyhydroxide layer on the surface of nickel hydroxide particles (Japanese Kokai Tokkyo Koho S62-234867 and Japanese Kokai Tokkyo Koho H03-78965). These are attempts to improve the active material utilization efficiency by increasing the electron conductivity (electric conductivity) on the surface of active material particles.

However, the non-sintered nickel electrodes mentioned above are disadvantageous in that the active material utilization efficiency, in particular in a high temperature atmosphere, is low. This is because, at high temperatures, the oxygen overvoltage of the electrode decreases and the charging electrical energy is consumed not only by the charging reaction converting nickel hydroxide to nickel oxyhydroxide but also by the oxygen-generating reaction resulting from decomposition of water (water in alkaline electrolyte solution).

For removing this drawback, it has been proposed to add metallic cobalt, cobalt hydroxide and an yttrium compound to the nickel hydroxide powder to thereby provide non-sintered nickel electrodes capable of expressing high active material utilization efficiency over a wide temperature range (0 to 45 °C.) (see Japanese Kokai Tokkyo Koho H05-28992).

However, an investigation made by the present inventors has revealed that the non-sintered nickel electrodes disclosed in Japanese Kokai Tokkyo Koho H05-28992 have a problem in that charging in a high-temperature atmosphere of about 60° C. results in a markedly decreased active material utilization efficiency.

It is an object of the present invention made in view of the foregoing to provide a non-sintered nickel electrode for the alkaline storage battery which can express high active material utilization efficiency not only when charging is conducted at ordinary temperature but also when charging is conducted in a high-temperature atmosphere.

SUMMARY OF THE INVENTION

In the non-sintered nickel electrode (electrode X of the invention) for an alkaline storage battery as provided by the present invention, the active material powder comprises composite particles each composed of a substrate particle containing nickel hydroxide, an inner coat layer covering said substrate particle and comprising yttrium, scandium or a lanthanoid, or an yttrium, scandium or lanthanoid compound, and an outer coat layer covering said inner coat layer and comprising cobalt or a cobalt compound.

In the non-sintered nickel electrode according to a further aspect of the invention (electrode Y of the invention), arrangement of said inner and outer coat layers is reversed.

DETAILED DESCRIPTION OF THE INVENTION

The active material powder in the electrode X of the invention comprises composite particles each composed of a substrate particle containing nickel hydroxide and coated with two layers, namely the inner and outer coat layers defined above.

The nickel hydroxide-containing substrate particle includes single-component particles consisting of nickel hydroxide alone, and solid solution particles derived from nickel hydroxide and at least one element selected from among cobalt, zinc, cadmium, calcium, manganese, magnesium, bismuth, aluminum, lanthanoids and yttrium. By forming solid solutions from nickel hydroxide and one or more of the above-mentioned elements, the swelling of non-sintered nickel electrodes at the time of charging can be suppressed.

The inner coat layer covering the substrate particle comprises yttrium, scandium or a lanthanoid, or an yttrium, scandium or lanthanoid compound. The yttrium compound includes yttrium hydroxide ($Y(OH)_3$), diyttrium trioxide ($Y_2O_3$), yttrium carbonate ($Y_2(CO_3)_3$ and yttrium fluoride ($YF_3$), among others. The scandium or lanthanoid compound includes hydroxides thereof ($Sc(OH)_3$, $La(OH)_3$, $Ce(OH)_3$, $Pr(OH)_3$, $Nd(OH)_3$, $Pm(OH)_3$, $Eu(OH)_3$, $Gd(OH)_3$, $Tb(OH)_3$, $Dy(OH)_3$, $Ho(OH)_3$, $Er(OH)_3$, $Tm(OH)_3$, etc.), oxides thereof ($Sc_2O_3$, $La_2O_3$, $CeO_2$, $Pr_6O_{11}$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$, $Lu_2O_3$, etc.), carbonates thereof ($La_2(CO_3)_3$, $Ce_2(CO_3)_3$, $Nd_2(CO_3)_3$, $Sm_2(CO_3)_3$, etc.), and fluorides thereof ($LaF_3$, $CeF_3$, $PrF_3$, $NdF_3$, $SmF_3$, $GdF_3$, $TbF_3$, $DyF_3$, $ErF_3$, $YbF_3$, $HoF_3$, etc.).

A method for forming an inner (oat layer comprising the hydroxide of yttrium, scandium or a lanthanoid on the substrate particle surface comprises, for example, adding a nickel hydroxide powder to an aqueous solution of a salt of yttrium, scandium or a lanthanoid (e.g. aqueous solution of yttrium sulfate), adjusting the pH to 9 to 12 (generally about 11) by adding dropwise an aqueous alkali solution (e.g. aqueous solution of sodium hydroxide) with stirring, and stirring the resulting mixture for a predetermined period while maintaining the pH at a practically constant level by adding an aqueous alkali solution dropwise each time there is found a decrease in pH, to thereby cause deposition of the hydroxide of yttrium, scandium or the lanthanoid on the surface of the nickel hydroxide particle.

The inner coat layer comprising the hydroxide of yttrium, scandium or a lanthanoid can also be formed by the mechanical charging method which comprises dry blending a nickel hydroxide powder and the hydroxide, in powder form, of yttrium, scandium or the lanthanoid in an inert gas using a compression attrition mill. When, in carrying out this mechanical charging method, yttrium, scandium or a lanthanoid, or the oxide, carbonate or fluoride thereof is used, each in powder form, in lieu of the hydroxide, in powder form, of yttrium, scandium or the lanthanoid, an inner coat layer can be formed which comprises yttrium, scandium or the lanthanoid, or the oxide, carbonate or fluoride thereof, respectively.

The proportion of yttrium, scandium or a lanthanoid in the inner coat layer relative to the nickel hydroxide in the substrate particle is preferably 0.05 to 5% by weight. Then this proportion is below 0.05% by weight, it is difficult to satisfactorily suppress the decrease in active material utilization efficiency as resulting from charging in a high-temperature atmosphere. When said proportion exceeds 5% by weight, the packing density of the active material (nickel hydroxide) becomes low and the specific capacity (discharge capacity) of the electrode decreases.

The outer coat layer covering the inner coat layer comprises cobalt or a cobalt compound. As the cobalt compound, there may be mentioned, for example, cobalt monoxide, cobalt hydroxide, cobalt oxyhydroxide and a sodium-containing cobalt compound.

As a method of forming an outer coat layer comprising cobalt hydroxide on the inner coat layer, there may be mentioned, for example, the method comprising adding a nickel hydroxide powder the particle surface of which has been coated with an inner coat layer, to an aqueous solution of a cobalt salt (e.g. aqueous solution of cobalt sulfate), adjusting the pH to 9 to 12 (usually about 11) by adding dropwise an aqueous alkali solution (e.g. aqueous solution of sodium hydroxide) with stirring, and stirring the resulting mixture for a predetermined period while maintaining the pH at a practically constant level by adding an aqueous alkali solution from time to time when a decrease in pH is found, to thereby cause deposition of cobalt hydroxide on the surface of the inner coat layer.

The outer coat layer comprising cobalt hydroxide can also be formed by the mechanical charging method which comprises dry blending the nickel hydroxide powder and a cobalt hydroxide powder in an inert gas using a compression attrition mill. When, in carrying out this mechanical charging method, a cobalt monoxide powder or a cobalt powder is used in lieu of the cobalt hydroxide powder, an outer coat layer can be formed which comprises the cobalt monoxide or cobalt, respectively.

An outer coat layer comprising cobalt oxyhydroxide can be formed, for example, by forming a cobalt hydroxide layer on the surface of the inner coat layer and then oxidizing said cobalt hydroxide layer with an aqueous hydrogen peroxide solution heated to about 40° C. An outer coat layer comprising a sodium-containing cobalt compound can be formed, for example, by adding an aqueous sodium hydroxide solution to a powder composed of particles having a cobalt layer or a cobalt compound layer, such as a cobalt hydroxide layer, cobalt monoxide layer or cobalt oxyhydroxide layer, on the surface of the inner coat layer, followed by heat treatment in the presence of oxygen. Mere addition of the aqueous sodium hydroxide solution cannot attain formation of the coat layer comprising the sodium-containing cobalt compound. Heat treatment in the presence of oxygen is essential. The heat treatment is preferably carried out at 50–200° C. When the heat treatment temperature is below 50° C., $CoHO_2$ showing a low conductivity is deposited in large amounts. On the other hand, when the heat treatment temperature exceeds 200° C., tricobalt tetraoxide ($Co_3O_4$), which is also low in conductivity, is deposited in increased amounts. When the cobalt compound layer is a cobalt oxyhydroxide layer, heat treatment at below 50° C. will not cause deposition of $CoHO_2$ but makes the incorporation of sodium difficult. The heat treatment time required depends on the quantity and concentration of the aqueous sodium hydroxide solution used, the heat treatment temperature and other factors. Generally, however, said time is 0.5 to 10 hours.

As typical examples of the sodium-containing cobalt compound, there may be mentioned sodium-containing cobalt hydroxide, sodium-containing cobalt oxyhydroxide and a mixture of these. The chemical structure of the sodium-containing cobalt compound is not yet clearly known to the present inventors. It is presumable, however, that this is not a simple mixture of a cobalt compound and sodium but might be a compound having a special crystal structure with sodium incorporated in crystals of the cobalt compound, since it has a very high conductivity. The sodium content in the sodium-containing cobalt compound is suitably within the range of 0.1 to 10% by weight. When the sodium content is outside this range, the conductivity of the coat layer tends to decrease, and the active material utilization efficiency to decrease.

The proportion of the outer coat layer relative to the composite particle is preferably 3 to 15% by weight. When this proportion is below 3% by weight, the electron conductivity on the active material particle surface becomes insufficient, hence it becomes difficult to obtain a non-sintered nickel electrode with high active material utilization efficiency. Then said proportion exceeds 15% by weight, the packing density of the active material (nickel hydroxide) becomes small and the specific capacity of the electrode becomes decreased.

The electrode X of the invention, in which an active material powder composed of composite particles each comprising a substrate particle containing nickel hydroxide, an inner coat layer comprising yttrium, scandium or a lanthanoid, or an yttrium, scandium or lanthanoid compound, which suppresses the decrease in oxygen overvoltage on the occasion of high-temperature charging, and an outer coat layer comprising cobalt or a cobalt compound, which provides electron conductivity, shows smaller reductions in active material utilization efficiency even when charging is conducted in a high-temperature atmosphere. This is because the inner coat layer suppresses the decrease in oxygen overvoltage at the time of high-temperature charging and the charged electric energy is effectively consumed in the charging reaction of the active material and, at the same time, the electron conductivity of the active material particle surface is increased by the outer coat layer.

In another aspect of the present invention, a non-sintered nickel electrode for the alkaline storage battery (electrode Y of the invention) comprises an active material powder composed of composite particles each comprising a substrate particle containing nickel hydroxide, an inner coat layer covering said substrate particle and comprising cobalt or a cobalt compound, and an outer coat layer covering said inner coat layer and comprising yttrium, scandium or a lanthanoid, or an yttrium, scandium or lanthanoid compound.

The active material of electrode Y of the invention comprises composite particles each comprising a nickel hydroxide-containing substrate particle coated with two layers, namely the inner and outer coat layers defined above.

The nickel hydroxide-containing substrate particle includes single-component particles consisting of nickel hydroxide alone, and solid solution particles derived from nickel hydroxide and at least one element selected from among cobalt, zinc, cadmium, calcium, manganese, magnesium, bismuth, aluminum, lanthanoids and yttrium. By forming solid solutions from nickel hydroxide and one or more of the above-mentioned elements, the swelling of non-sintered nickel electrodes at the time of charging can be suppressed.

The inner coat layer covering the substrate particle comprises cobalt or a cobalt compound. As the cobalt compound, there may be mentioned, for example, cobalt monoxide, cobalt hydroxide, cobalt oxyhydroxide and a sodium-containing cobalt compound.

As a method of forming an inner coat layer comprising cobalt hydroxide on the substrate particle, there may be mentioned, for example, the method comprising adding a nickel hydroxide powder to an aqueous solution of a cobalt salt (e.g. aqueous solution of cobalt sulfate), adjusting the pH to 9 to 12 (usually about 11) by adding dropwise an aqueous alkali solution (e.g. aqueous solution of sodium hydroxide) with stirring, and stirring the resulting mixture for a predetermined period while maintaining the pH at a practically constant level by adding an aqueous alkali solution from time to time when a decrease in pH is found, to thereby cause deposition of cobalt hydroxide on the surface of the substrate particle.

The inner coat layer comprising cobalt hydroxide can also be formed by the mechanical charging method which comprises dry blending a nickel hydroxide powder and a cobalt hydroxide powder in an inert gas using a compression attrition mill. When, in carrying out this mechanical charging method, a cobalt monoxide powder or a cobalt powder is used in lieu of the cobalt hydroxide powder, an inner coat layer can be formed which comprises the cobalt monoxide or cobalt, respectively.

An inner coat layer comprising cobalt oxyhydroxide can be formed, for example, by forming a cobalt hydroxide layer on the surface of the substrate particle and then oxidizing said cobalt hydroxide layer with an aqueous hydrogen peroxide solution heated to about 40° C. An inner coat layer comprising a sodium-containing cobalt compound can be formed, for example, by adding an aqueous sodium hydroxide solution to a powder composed of particles having a cobalt layer or a cobalt compound layer, such as a cobalt hydroxide layer, cobalt monoxide layer or cobalt oxyhydroxide layer, on the surface of the substrate particle, followed by heat treatment in the presence of oxygen. Mere addition of the aqueous sodium hydroxide solution cannot attain formation of the coat layer comprising the sodium-containing cobalt compound. Heat treatment in the presence of oxygen is essential. The heat treatment is preferably carried out at 50–200° C. When the heat treatment temperature is below 50° C., $CoHO_2$ showing a low conductivity is deposited in large amounts. On the other hand, when the heat treatment temperature exceeds 200° C., tricobalt tetraoxide ($Co_3O_4$), which is also low in conductivity, is deposited in increased amounts. When the cobalt compound layer is a cobalt oxyhydroxide layer, heat treatment at below 50° C. will not cause deposition of $CoHO_2$ but makes the incorporation of sodium difficult. The heat treatment time required depends on the quantity and concentration of the aqueous sodium hydroxide solution used, the heat treatment temperature and other factors. Generally, however, said time is 0.5 to 10 hours.

As typical examples of the sodium-containing cobalt compound, there may be mentioned sodium-containing cobalt hydroxide, sodium-containing cobalt oxyhydroxide and a mixture of these. The chemical structure of the sodium-containing cobalt compound is not yet clearly known to the present inventors. It is presumable, however, that this is not a simple mixture of a cobalt compound and sodium but might be a compound having a special crystal structure with sodium incorporated in crystals of the cobalt compound, since it has a very high conductivity. The sodium content in the sodium-containing cobalt compound is suitably within the range of 0.1 to 10% by weight. When the sodium content is outside this range, the conductivity of the coat layer tends to decrease, and the active material utilization efficiency to decrease.

The proportion of the inner coat layer relative to the sum total of the substrate particle plus the inner coat layer is preferably 3 to 15% by weight. When this proportion is below 3% by weight, the electron conductivity on the active material particle surface becomes insufficient, hence it becomes difficult to obtain a non-sintered nickel electrode with high active material utilization efficiency. When said proportion exceeds 15% by weight, the packing density of the active material (nickel hydroxide) becomes small and the specific capacity of the electrode becomes decreased.

The outer coat layer covering the inner coat layer comprises yttrium, scandium or a lanthanoid, or an yttrium, scandium or lanthanoid compound. The yttrium compound includes yttrium hydroxide ($Y(OH)_3$), diyttrium trioxide ($Y_2O_3$), yttrium carbonate ($Y_2(CO_3)_3$ and yttrium fluoride ($YF_3$), among others. The scandium or lanthanoid compound includes hydroxides thereof ($Sc(OH)_3$, $La(OH)_3$, $Ce(OH)_3$, $Pr(OH)_3$, $Nd(OH)_3$, $Pm(OH)_3$, $Eu(OH)_3$, $Gd(OH)_3$, $Tb(OH)_3$, $Dy(OH)_3$, $Ho(OH)_3$, $Er(OR)_3$, $Tm(OH)_3$, etc.), oxides thereof ($Sc_2O_3$, $La_2O_3$, $CeO_2$, $Pr_6O_{11}$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$, $Lu_2O_3$, etc.), carbonates thereof ($La_2(CO_3)_3$, $Ce_2(CO_3)_3$, $Nd_2(CO_3)_3$, $Sm_2(CO_3)_3$, etc.), and fluorides thereof ($LaF_3$, $CeF_3$, $PrF_3$, $NdF_3$, $SmF_3$, $GdF_3$, $TbF_3$, $DyF_3$, $ErF_3$, $YbF_3$, $HoF_3$, etc.).

A method for forming an outer coat layer comprising the hydroxide of yttrium, scandium or a lanthanoid on the inner coat layer comprises, for example, adding a nickel hydroxide powder the particle surface of which has been coated with an inner coat layer, to an aqueous solution of a salt of yttrium, scandium or a lanthanoid (e.g. aqueous solution of yttrium sulfate), adjusting the pH to 9 to 12 (generally about 11) by adding dropwise an aqueous alkali solution (e.g. aqueous solution of sodium hydroxide) with stirring, and stirring the resulting mixture for a predetermined period while maintaining the pH at a practically constant level by adding an aqueous alkali solution dropwise each time there is found a decrease in pH, to thereby cause deposition of the hydroxide of yttrium, scandium or the lanthanoid on the surface of the nickel hydroxide particle.

The outer coat layer comprising the hydroxide of yttrium, scandium or a lanthanoid can also be formed by the mechanical charging method which comprises dry blending the nickel hydroxide powder and the hydroxide, ir powder form, of yttrium, scandium or the lanthanoid in an inert gas using a compression attrition till. When, in carrying out this mechanical charging method, yttrium, scandium or a lanthanoid, or the oxide, carbonate or fluoride thereof is used, each in powder form, in lieu of the hydroxide, in powder form, of yttrium, scandium or the lanthanoid, an outer coat layer can be formed which comprises yttrium, scandium or the lanthanoid, or the oxide, carbonate or fluoride thereof, respectively.

The proportion of yttrium, scandium or a lanthanoid in the outer coat layer relative to the nickel hydroxide in the substrate particle is preferably 0.05 to 5% by weight. Then this proportion is below 0.05% by weight, it is difficult to satisfactorily suppress the decrease in active material utilization efficiency as resulting from charging in a high-temperature atmosphere. When said proportion exceeds 5% by weight, the packing density of the active material (nickel hydroxide) becomes low and the specific capacity (discharge capacity) of the electrode decreases.

The electrode Y of the invention, in which an active material powder composed of composite particles each comprising a substrate particle containing nickel hydroxide, an inner coat layer comprising cobalt or a cobalt compound, which provides electron conductivity, and an outer layer comprising yttrium, scandium or a lanthanoid, or an yttrium, scandium or lanthanoid compound, which suppresses the decrease in oxygen overvoltage on the occasion of high-temperature charging, shows smaller reductions in active material utilization efficiency even when charging is conducted in a high-temperature atmosphere. This is because the electron conductivity of the active material particle surface is increased by the inner coat layer and the decrease in oxygen overvoltage at the time of high-temperature charging is suppressed owing to the outer coat layer and, at the same time, the charged electric energy is effectively consumed in the charging reaction of the active material.

Meanwhile, the method disclosed in the above-cited publication Japanese Kokai Tokkyo Koho H05-28992 which comprises blending a nickel hydroxide powder with a powder of metallic cobalt, cobalt hydroxide or an yttrium compound cannot give such non-sintered nickel electrodes having excellent high-temperature charging characteristics as electrodes X and Y of the present invention. This is because the electron conductivity providing effect of the metallic cobalt or cobalt hydroxide upon the nickel hydroxide particle surface is lessened by the addition of the yttrium compound.

As suitable examples of the non-sintered nickel electrode for the alkaline storage battery as obtainable by applying the present invention, there may be mentioned pasted nickel electrodes producible by applying a paste containing the active material to conductive core bodies, followed by drying. In that case, the conductive cores include, as typical examples, foamed nickel, felt-like porous bodies made of metal fiber, and punching metals. The present invention can also be suitably applied to tubular nickel electrodes comprising the active material packed or filled in tubular metal conductors, pocket type nickel electrodes with the active material packed in pocket-shaped metal conductors, and nickel electrodes for button cells as producible by pressure-molding the active material together with gauze-like metal conductors, among others.

As suitable examples of the alkaline storage battery in which electrode X or Y of the invention is used as the positive electrode, there may be mentioned nickel-hydrogen batteries (negative electrode: hydrogen-absorbing alloy electrode), nickel-cadmium batteries (negative electrode: cadmium electrode) and nickel-zinc batteries (negative electrodes: zinc electrode).

EXAMPLES

The following examples illustrate the present invention in further detail. They are, however, by no means limitative of the scope thereof. Various modifications may be made without departing from the scope and spirit of the invention.

Preliminary experiment

A sodium-containing cobalt compound was prepared by mixing cobalt hydroxide and a 25% (by weight) aqueous solution of sodium hydroxide in a weight ratio of 1:10 and subjecting the mixture to heat treatment at 85° C. for 8 hours, followed by washing with water and drying at 60° C. The sodium content in the thus-prepared sodium-containing cobalt compound was determined by atomic absorption analysis and was found to be 1% by weight.

Example X-1

An electrode X of the invention and an alkaline storage battery were produced by the following five-step procedure.

Step 1: A nickel hydroxide powder (mean particle size: 10 $\mu$m) (100 g) was added to an aqueous solution (1 liter) containing 2.62 g of yttrium sulfate. The pit of the liquid phase was adjusted to 11 by adding 1 M aqueous sodium hydroxide with stirring and the reaction was allowed to proceed for 1 hour while continuing stirring. The pH of the liquid phase was maintained at 11 by adequately adding 1 M aqueous sodium hydroxide at times when a certain decrease in pH was found. In this case, pH monitoring was conducted using a glass electrode (pH meter) with an automatic temperature compensation mechanism.

Then, the precipitate was filtered off, washed with water and dried under vacuum to give a powder composed of particles each comprising a nickel hydroxide particle (substrate particle) and an inner coat layer comprising yttrium hydroxide as formed on the surface of the substrate particle. The proportion of yttrium in the inner coat layer relative to the nickel hydroxide in the substrate particle was determined by inductively coupled plasma atomic emission spectrometry and was found to be 1% by weight.

Step 2: The particulate powder obtained in step 1 (100 g) was added to an aqueous solution (one liter) containing 13.1 g of cobalt sulfate. The pH of the liquid phase was adjusted to 11 by adding 1 M aqueous sodium hydroxide with stirring and then the reaction was allowed to proceed for 1 hour with continued stirring. Like in step 1, the pH of the liquid phase was maintained at 11 by adequately adding 1 M aqueous sodium hydroxide at times when a certain decrease in pH was found.

Then, the precipitate was filtered off, washed with water and dried under vacuum to give a powder composed of particles each comprising the particle obtained in Step 1 and a coat layer comprising cobalt hydroxide as formed on the surface of said particle.

Step 3: The particulate powder obtained in Step 2 and a 25% (by weight) aqueous solution of sodium hydroxide were mixed up in a weight ratio of 1:10, and the mixture was heat-treated at 85° C. for 8 hours, then washed with water and dried at 65° C. to give an active material powder composed of composite particles with an outer coat layer comprising a sodium-containing cobalt compound as formed on the inner coat layer comprising yttrium hydroxide. The content of sodium in the outer coat layer was estimated to be 1% by weight based on the result of the preliminary experiment. The proportion of the outer coat layer relative to the composite particle was determined by determining the cobalt content by atomic absorption analysis and was found to be 5% by weight.

Step 4: A paste was prepared by kneading 100 parts by weight of the active material powder (mean particle size: 10 $\mu$m) obtained in step 3 with 20 parts by weight of a 1% (by weight) aqueous solution of methyl cellulose as a binder. This paste was packed into a porous conductive base plate consisting of foamed nickel (porosity 95%, mean pore size 200 $\mu$m), followed by drying and pressure molding, to give a non-sintered nickel electrode (electrode X of the invention) Xa1. The size of electrode Xa1 of the invention was 70 mm (length)×40 mm (width)×0.70 mm (thickness). The non-sintered nickel electrodes produced in the subsequent examples all had the same size as mentioned above.

Step 5: An AA-size alkaline storage battery (battery capacity: about 1,000 mAh) XA1 was fabricated using the electrode Xa1 (positive electrode) produced in step 4, a prior art pasted cadmium electrode (negative electrode) having a capacity 1.5 times that of the positive electrode, a nonwoven polyamide fabric (separator), a 30% (by weight) aqueous solution of potassium hydroxide (alkaline electrolyte solution), a metal can, a metal cell cover and so on. The size of the cadmium electrode was 85 mm (length)×40 mm (width)×0.35 mm (thickness). For the purpose of investigating the characteristics of the non-sintered nickel electrode, the capacity of the negative electrode was made about 1.5 times that of the positive electrode. In the batteries fabricated in the subsequent examples and comparative examples as well, the capacity of the negative electrode was about 1.5 times that of the positive electrode.

Examples X-2 to X-17

Electrodes Xa2 to Xa17 of the present invention (electrodes X of the invention) were produced and alkaline storage batteries XA2 to XA17 were fabricated by proceeding in the same manner as in Example X-1 except that scandium nitrate or a lanthanoid nitrate specifically shown in Table 1 was used in lieu of yttrium sulfate in step 1.

TABLE 1

| Electrode | Nitrate of scandium or lanthanoid used for forming the inner coat layer | Amount of nitrate used (g) |
| --- | --- | --- |
| Xa2 | $Sc(NO_3)_3 \cdot 4H_2O$ | 13.75 |
| Xa3 | $La(NO_3)_3 \cdot 6H_2O$ | 6.36 |
| Xa4 | $Ce(NO_3)_3 \cdot 6H_2O$ | 6.30 |
| Xa5 | $Pr(NO_3)_3 \cdot 6H_2O$ | 6.30 |
| Xa6 | $Nd(NO_3)_3 \cdot 6H_2O$ | 6.20 |
| Xa7 | $Pm(NO_3)_3 \cdot 6H_2O$ | 6.18 |
| Xa8 | $Sm(NO_3)_3 \cdot 6H_2O$ | 6.03 |
| Xa9 | $Eu(NO_3)_3 \cdot 6H_2O$ | 5.99 |
| Xa10 | $Gd(NO_3)_3 \cdot 5H_2O$ | 5.62 |
| Xa11 | $Tb(NO_3)_3 \cdot 5H_2O$ | 5.82 |
| Xa12 | $Dy(NO_3)_3 \cdot 5H_2O$ | 5.51 |
| Xa13 | $Ho(NO_3)_3 \cdot 5H_2O$ | 5.46 |
| Xa14 | $Er(NO_3)_3 \cdot 5H_2O$ | 5.41 |
| Xa15 | $Tm(NO_3)_3 \cdot 5H_2O$ | 5.16 |
| Xa16 | $Yb(NO_3)_3 \cdot 3H_2O$ | 4.87 |
| Xa17 | $Lu(NO_3)_3 \cdot 3H_2O$ | 4.84 |

Comparative Example X-1

An electrode Xb for comparison was produced and a battery XB for comparison was fabricated in the same manner as in Example X-1 except that step 1 was omitted.

Comparative Example X-2

A paste was prepared by kneading 100 parts by weight of nickel hydroxide, 7 parts by weight of metallic cobalt, 5 parts by weight of cobalt hydroxide, 3 parts by weight of diyttrium trioxide (mean particle size 1 $\mu$m) and 20 parts by weight of a 1% (by weight) aqueous solution of methyl cellulose (as binder). This paste was packed into a porous conductive base plate made of foamed nickel (porosity 95%, mean pore size 200 $\mu$m), followed by drying and pressure molding, to give an electrode Xc for comparison. Then, a battery XC for comparison was fabricated in the same manner as in Example X-1 except that said electrode Xc for comparison was used in step 5. The procedure employed in producing this battery is the one disclosed in Japanese Kokai Tokkyo Koho H05-28992.

Comparative Example X-3

An electrode Xd for comparison was produced and a battery XD for comparison was fabricated in the same manner as in Example X-1 except that steps 2 and 3 were omitted and the sodium-containing cobalt compound prepared in the preliminary experiment was added to the particulate powder prepared in step 1 in an amount of 5 parts by weight per 100 parts by weight of nickel hydroxide in substrate particles.

Active material utilization efficiency of each of the non-sintered nickel electrodes Each battery was subjected to 10 charge/discharge cycles each comprising 160% charging at 0.1 C at 25° C., followed by discharge until 1.0 V at 1 C at 25° C. The active material utilization efficiency, for the 10th cycle, of the non-sintered nickel electrode used in each battery was determined. Then, each battery was 160% charged at 0.1 C at 60° C. and discharged until 1.0 V at 1 C at 25° C. and the active material utilization efficiency following high-temperature atmosphere charging was determined. The active material utilization efficiency was calculated as follows:

Active material utilization efficiency (%)=[discharge capacity (mAh)/[amount of nickel hydroxide (g)×288 (mAh/g)]]×100

The results thus obtained are shown in Table 2. In Table 2, the active material utilization efficiency values are relative indices with the active material utilization efficiency of electrode Xa1 of the invention being taken as 100.

TABLE 2

| Electrode | Inner coat layer | Active material utilization efficiency at 10th cycle in charge/discharge cycles at 25° C. | Active material utilization efficiency in charging at 60° C. |
| --- | --- | --- | --- |
| Xa1 | Y(OH)$_3$ | 100 | 68 |
| Xa2 | Sc (OH)$_3$ | 100 | 65 |
| Xa3 | La (OH)$_3$ | 100 | 67 |
| Xa4 | Ce (OH)$_3$ | 98 | 66 |
| Xa5 | Pr (OH)$_3$ | 100 | 67 |
| Xa6 | Nd (OH)$_3$ | 100 | 67 |
| Xa7 | Pm (OH)$_3$ | 99 | 66 |
| Xa0 | Sm (OH)$_3$ | 99 | 67 |
| Xa9 | Eu (OH)$_3$ | 100 | 66 |
| Xa10 | Gd (OH)$_3$ | 100 | 66 |
| Xa11 | Tb (OH)$_3$ | 99 | 65 |
| Xa12 | Dy (OH)$_3$ | 100 | 67 |
| Xa13 | Ho (OH)$_3$ | 99 | 67 |
| Xa14 | Er (OH)$_3$ | 100 | 68 |
| Xa15 | Tm (OH)$_3$ | 100 | 67 |
| Xa16 | Yb (OH)$_3$ | 100 | 66 |
| Xa17 | Lu (OH)$_3$ | 100 | 65 |
| Xb | — | 100 | 60 |
| Xc | — | 75 | 30 |
| Xd | — | 81 | 63 |

As shown in Table 2, electrodes Xa1 to Xa17 of the invention showed high active material utilization efficiency in both cases of charging at 25° C. and charging at 60° C. On the contrary, electrode Xb for comparison showed lower active material utilization efficiency at the time of charging at 60 ° C. as compared with electrodes Xa1 to Xa17 of the invention although, at the time of charging at 25° C., it was comparable in active material utilization efficiency to electrodes Xa1 to Xa17 of the invention. This is presumably because the inner coat layer comprising yttrium hydroxide was not formed on the surface of the nickel hydroxide particle, hence the decrease in oxygen overvoltage at the time of high-temperature charging was not suppressed to a sufficient extent. The active material utilization efficiency of electrode Xc for comparison at the time of charging at 25° C. and that at 60° C. were very low and this was presumably due to the electron conductivity-providing effect resulting from the addition of metallic cobalt and cobalt hydroxide having been lessened by the simultaneous addition of diyttrium trioxide. The low active material utilization efficiency of electrode Xd for comparison at the time of charging at 25° C. is presumably due to the fact that no outer coat layer was formed and the sodium-containing cobalt compound was merely added, so that the electron conductivity of the nickel hydroxide particle surface could not be increased effectively.

Relationship between the proportion of yttrium in the inner coat layer relative to the nickel hydroxide in the substrate particle and the active material utilization efficiency at the time of high-temperature charging or the discharge capacity Non-sintered nickel electrodes Xe1 to Xe7 were produced and alkaline storage batteries XE1 to XE7 were fabricated in the same manner as in Example X-1 except that, in step 1, an aqueous solution (1 liter) containing 0.079 g, 0.13 g, 1.31 g, 7.86 g, 13.1 g, 15.7 g or 20.9 g of yttrium sulfate was used in lieu of the aqueous solution (1 liter) containing 2.62 g of yttrium sulfate. With each of non-sintered nickel electrodes Xe1 to Xe7, the proportion of yttrium in the inner coat layer relative to the nickel hydroxide in the substrate particle was determined by assaying yttrium by inductively coupled plasma atomic emission spectrometry. As shown in Table 3, the respective proportions were, in the order mentioned above, 0.03% by weight, 0.05% by weight, 0.5% by weight, 3% by weight, 5% by weight, 6% by weight and 8% by weight.

TABLE 3

| Electrode | Xe1 | Xe2 | Xe3 | Xa1 | Xe4 | Xe5 | Xe6 | Xe7 |
| --- | --- | --- | --- | --- | --- | --- | --- | --- |
| Amount of yttrium sulfate used (g) | 0.079 | 0.13 | 1.31 | 2.62 | 7.86 | 13.1 | 15.7 | 20.9 |
| Proportion of yttrium relative to nickel hydroxide (% by weight) | 0.03 | 0.05 | 0.5 | 1 | 3 | 5 | 6 | 8 |

Then, each battery was subjected to the same charge/discharge test as mentioned above (10 cycles of charge and discharge at 25° C., followed by one cycle of charge at 60° C. and discharge at 25° C.) and the discharge capacity, for the 10th charge/discharge at 25° C., of the non-sintered nickel electrode used in each battery and the active material utilization efficiency at the time of charging at 60° C. were determined. The respective results thus obtained are shown in FIG. 1 and FIG. 2.

Figure 1:
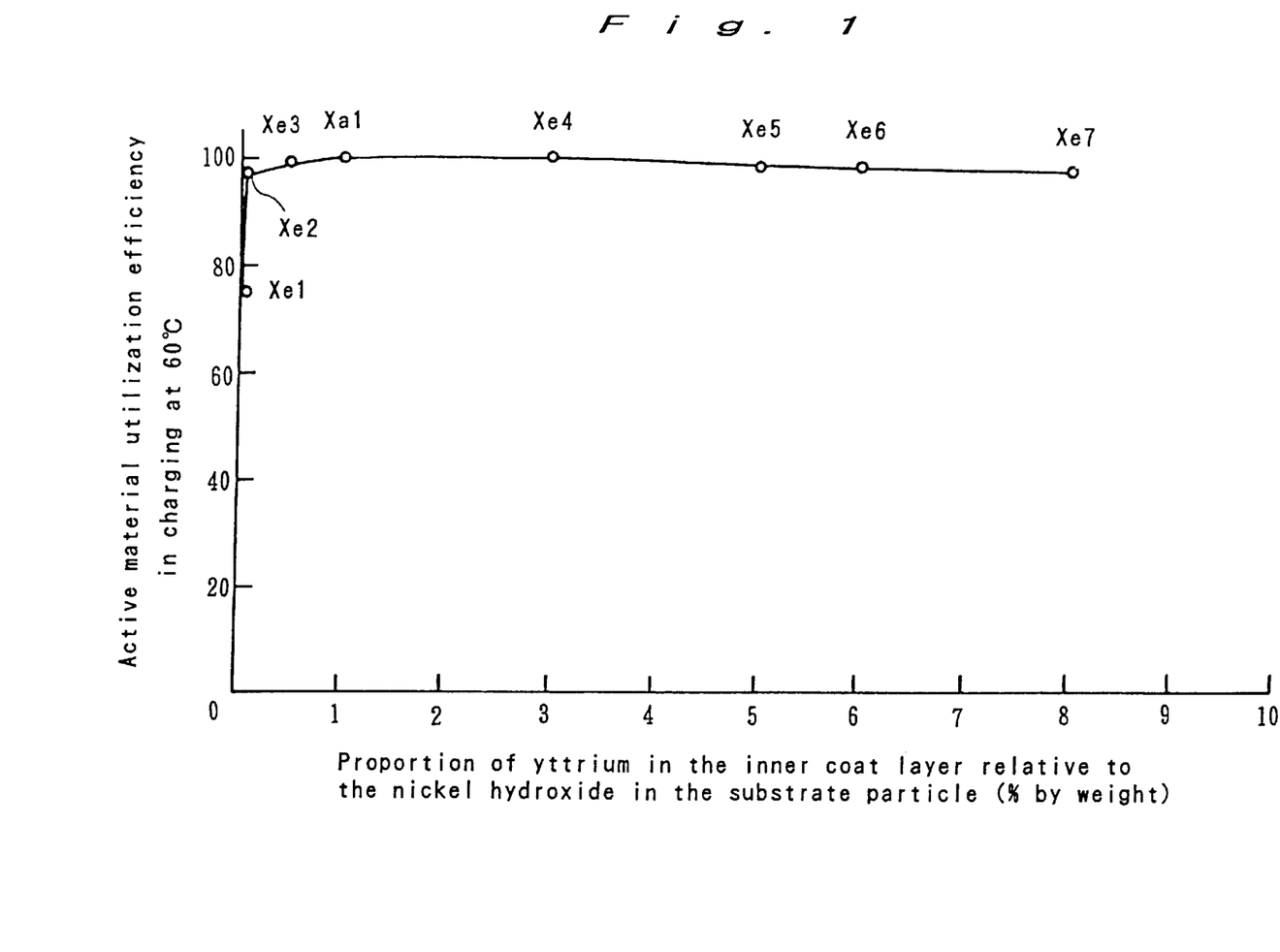
FIG. 1 is a graphic representation of the relationship between the proportion of yttrium in the inner coat layer relative to the nickel hydroxide in substrate particles and the active material utilization efficiency at the time of high-temperature charging.

FIG. 1 is a graphic representation of the relationship between the proportion of yttrium in the inner coat layer relative to the nickel hydroxide in the substrate particle and the active material utilization efficiency at the time of high-temperature charging, the ordinate denoting the active material utilization efficiency at the time of charging at 60 ° C. and the abscissa denoting the proportion (X by weight) of yttrium in the inner coat layer relative to the nickel hydroxide in the substrate particle. In FIG. 1, the active material utilization efficiency of electrode Xa1 of the invention at the time of charging at 60° C. is also shown. The active material utilization efficiency data shown in FIG. 1 (ordinate) are relative indices with the active material utilization efficiency of electrode Xa1 of the invention at the time of charging at 60° C. being taken as 100.

From FIG. 1, it is seen that, for obtaining a non-sintered nickel electrode showing high active material utilization efficiency at the time of high-temperature charging, the proportion of yttrium in the inner coat layer relative to the nickel hydroxide in the substrate particle should preferably be not less than 0.05% by weight.

Figure 2:
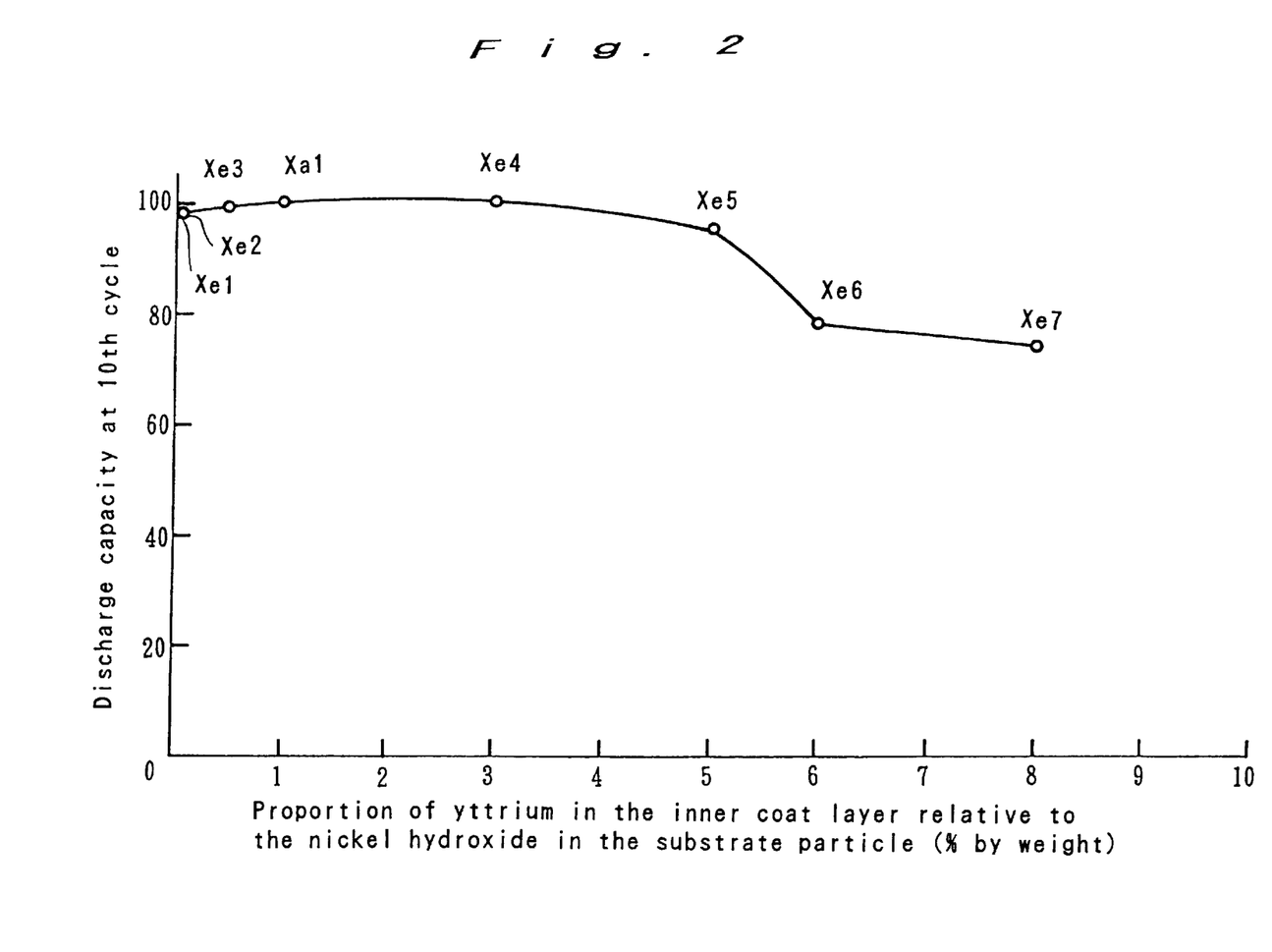
FIG. 2 is a graphic representation of the relationship between the proportion of yttrium in the inner coat layer relative to the nickel hydroxide in substrate particles and the discharge capacity.

FIG. 2 is a graphic representation of the relationship between the proportion of yttrium in the inner coat layer relative to the nickel hydroxide in the substrate particle and the discharge capacity, the ordinate denoting the discharge capacity following charging at 25° C. in the 10th cycle and the abscissa denoting the proportion (% by weight) of yttrium in the inner coat layer relative to the nickel hydroxide in the substrate particle. In FIG. 2, there is also shown the discharge capacity of electrode Xa1 of the invention following charging at 25° C. in the 10th cycle. The discharge capacity data shown in FIG. 2 (ordinate) are relative indices with the discharge capacity of electrode Xa1 of the invention following charging at 25° C. in the 10th cycle being taken as 100.

From FIG. 2, it is seen that, for obtaining a non-sintered nickel electrode showing great discharge capacity, the proportion of yttrium in the inner coat layer relative to the nickel hydroxide in the substrate particle should preferably be not more than 5% by weight.

As seen from FIG. 1 and FIG. 2, it is preferred that the proportion of yttrium in the inner coat layer relative to the nickel hydroxide in the substrate particle should be 0.05 to 5% by weight. For scandium and lanthanoids, it has been separately established that the proportions thereof in the inner coat layer relative to the nickel hydroxide in the substrate particle should preferably be 0.05 to 5% by weight. Relationship between the proportion of the outer coat layer relative to the composite particle and the active material utilization efficiency at the time of high-temperature charging or the discharge capacity Non-sintered nickel electrodes Xf1 to Xf7 were produced and alkaline storage batteries XF1 to XF7 were fabricated in the same manner as in Example X-1 except that, in step 2, an aqueous solution (1 liter) containing 1.31 g, 5.25 g, 7.88 g, 26.3 g, 39.4 g, 44.7 g or 52.5 g of cobalt sulfate was used in lieu of the aqueous solution (1 liter) containing 13.1 g of cobalt sulfate. With each of non-sintered nickel electrodes Xf1 to Xf7, the proportion of the outer coat layer relative to the composite particle was determined by assaying cobalt by atomic absorption analysis. As shown in Table 4, said proportion was 0.5% by weight, 2% by weight, 3% by weight, 10% by weight, 15% by weight, 17% by weight or 20% by weight, in the same order as mentioned above.

TABLE 4

| Electrode | Xf1 | Xf2 | Xf3 | Xa1 | Xf4 | Xf5 | Xf6 | Xf7 |
|---|---|---|---|---|---|---|---|---|
| Amount of cobalt sulfate used (g) | 1.31 | 5.25 | 7.88 | 13.1 | 26.3 | 39.4 | 44.7 | 52.5 |
| Proportion of the outer coat layer relative to the composite particle (% by weight) | 0.5 | 2 | 3 | 5 | 10 | 15 | 17 | 20 |

Figure 3:
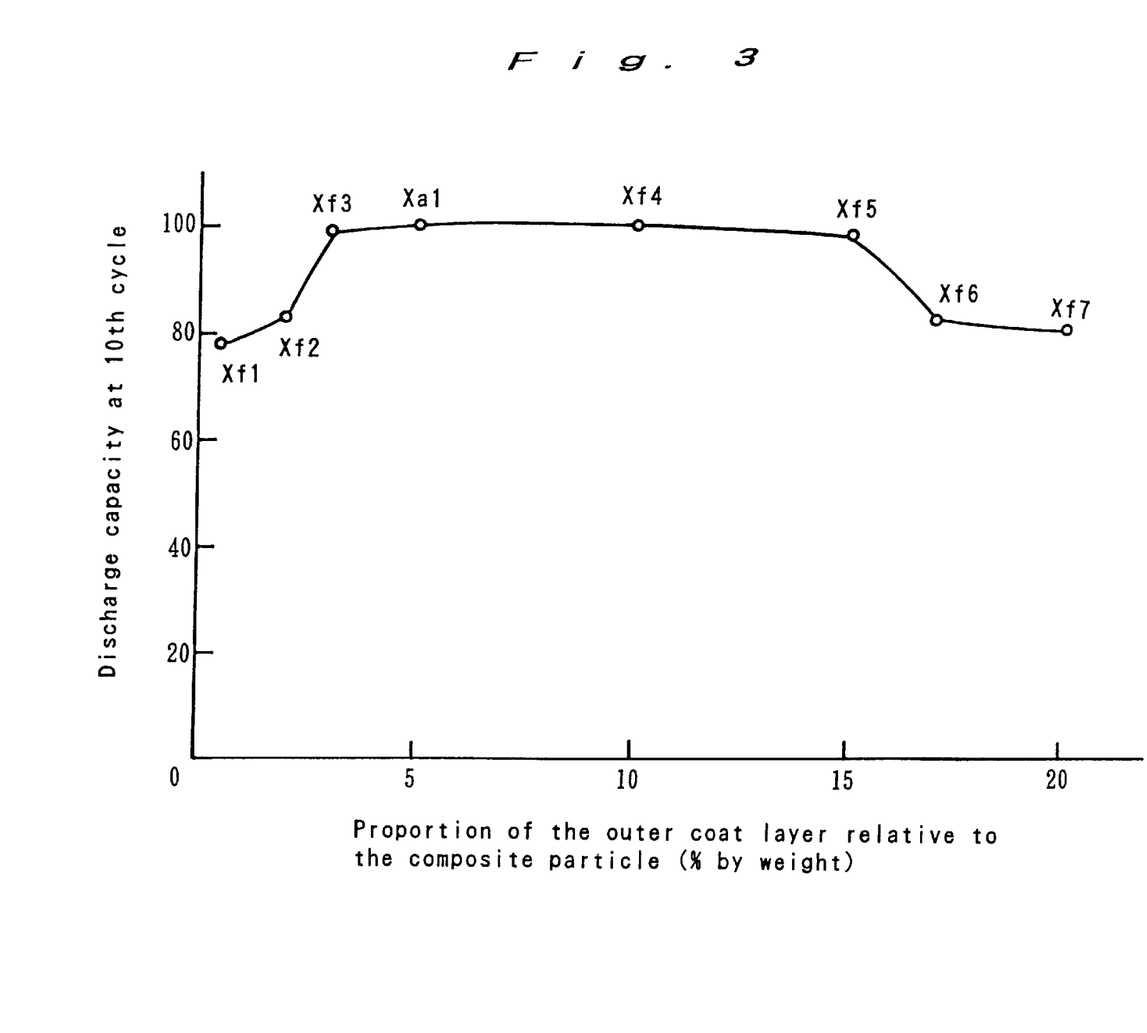
FIG. 3 is a graphic representation of the relationship between the proportion of the outer coat layer relative to the composite particle and the discharge capacity.

Then, each battery was subjected to the same charge/discharge test as mentioned above (10 cycles of charge and discharge at 25° C.), and the discharge capacity, for the 10th charge/discharge at 25° C., of the non-sintered nickel electrode used in each battery was determined. The results thus obtained are shown in FIG. 3. FIG. 3 is a graphic representation of the relationship between the proportion of the outer coat layer relative to the composite particle and the discharge capacity, the ordinate denoting the discharge capacity in the 10th cycle of charge/discharge at 25° C. and the abscissa denoting the proportion (% by weight) of the outer coat layer relative to the composite particle. In FIG. 3, there is also shown the discharge capacity of electrode Xa1 of the invention following charging at 25° C. in the 10th cycle. The discharge capacity data shown in FIG. 3 (ordinate) are relative indices with the discharge capacity of electrode Xa1 of the invention following charging at 25° C. in the 10th cycle being taken as 100.

As seen from FIG. 3, it is preferred that, for obtaining a non-sintered nickel electrode of great discharge capacity, the proportion of the outer coat layer relative to the composite particle should be 3 to 15% by weight.

Example Y-1

An electrode Y of the invention was produced and an alkaline storage battery was fabricated by the following five-step procedure.

Step 1: A nickel hydroxide powder (100 g, mean particle size 10 $\mu$m) was added to an aqueous solution (1 liter) containing 13.1 g of cobalt sulfate, the pH of the liquid phase was adjusted to 11 by adding 1 M aqueous sodium hydroxide with stirring, and the reaction was then allowed to proceed for 1 hour with stirring. The pH of the liquid phase was maintained at 11 by adequate addition of 1 M aqueous sodium hydroxide at times when a slight decrease in pH of the liquid phase was observed. In that case, pH monitoring was performed using a glass electrode (pH meter) with an automatic temperature compensation mechanism.

Then, the precipitate was collected by filtration, washed with water and dried under vacuum to give a powder composed of particles each comprising a nickel hydroxide particle (substrate particle) and a coat layer of cobalt hydroxide as formed thereon. The proportion of cobalt hydroxide relative to the sum total of nickel hydroxide and cobalt hydroxide was determined by assaying cobalt by atomic absorption analysis and was found to be 5% by weight.

Step 2: The particulate powder obtained in step 1 and a 25% (by weight) aqueous solution of sodium hydroxide were mixed up in a weight ratio of 1:10, and the mixture was heat-treated at 85° C. for 8 hours, followed by washing with water and drying at 65° C., to give a powder composed of particles each having an inner coat layer of a sodium-containing cobalt compound as formed on the surface of the substrate particle. The sodium content in the sodium-containing compound was estimated to be 1% by weight based on the result of the preliminary experiment mentioned hereinbefore. The proportion of the sodium-containing cobalt compound (inner coat layer) relative to the sum total of the nickel hydroxide and the sodium-containing cobalt compound was determined by assaying cobalt by atomic absorption analysis and was found to be about 5% by weight.

Step 3: The particulate powder obtained in step 2 (100 g) was added to an aqueous solution (1 liter) containing 2.62 g of yttrium sulfate, the pH of the liquid phase was adjusted to 11 by adding 1 M aqueous sodium hydroxide with stirring, and the reaction was allowed to proceed for 1 hour with stirring. The pH of the liquid phase was maintained at 11 by adequate addition of 1 M aqueous sodium hydroxide at times when a slight decrease in pH of the liquid phase was observed, as in step 1.

Then, the precipitate was collected by filtration, washed with water and dried under vacuum to give an active material powder composed of composite particles each comprising the particle obtained in step 2 and an outer coat layer of yttrium hydroxide as formed on the surface of said particle. The proportion of yttrium in the outer coat layer relative to the nickel hydroxide in the substrate particle was determined by assaying yttrium by inductively coupled plasma atomic emission spectrometry and was found to be 1% by weight.

Step 4: A paste was prepared by kneading 100 parts by weight of the active material powder obtained in step 3 (mean particle size 10 μm) and 20 parts by weight of a 1% (by weight) aqueous solution of methyl cellulose as a binder. This paste was packed into a porous conductive base plate made of foamed nickel (porosity 95%, mean pore size 200μm), followed by drying and press molding, to give a non-sintered nickel electrode Ya1 (electrode Y of the invention). The size of electrode Ya1 of the invention was 70 mm (length)×40 mm (width)×0.70 mm (thickness). The non-sintered nickel electrodes produced in the subsequent examples and comparative examples all had the same size as mentioned above.

Step 5: An AA-size alkaline storage battery (battery capacity: about 1,000 mAh) YA1 was fabricated using the electrode Ya1 (positive electrode) produced in step 4, a prior art pasted cadmium electrode (negative electrode) having a capacity 1.5 times that of the positive electrode, a nonwoven polyamide fabric (separator), a 30% (by weight) aqueous solution of potassium hydroxide (alkaline electrolyte solution), a metal can, a metal cell cover and so on. The size of the cadmium electrode was 85 mm (length)×40 mm (width)×0.35 mm (thickness). For the purpose of investigating the characteristics of the non-sintered nickel electrode, the capacity of the negative electrode was made about 1.5 times that of the positive electrode. In the batteries fabricated in the subsequent examples and comparative examples as well, the capacity of the negative electrode was about 1.5 times that of the positive electrode.

Examples Y-2 to Y-17

Electrodes Ya2 to Ya17 of the present invention (electrodes Y of the invention) were produced and alkaline storage batteries YA2 to YA17 were fabricated by proceeding in the same manner as in Example Y-1 except that scandium nitrate or a lanthanoid nitrate specifically shown in Table 5 was used in lieu of yttrium sulfate in step 3.

TABLE 5

| Electrode | Nitrate of scandium or lanthanoid used for forming the outer coat layer | Amount of nitrate used (g) |
|---|---|---|
| Ya2 | $Sc(NO_3)_3 \cdot 4H_2O$ | 13.75 |
| Ya3 | $La(NO_3)_3 \cdot 6H_2O$ | 6.36 |
| Ya4 | $Ce(NO_3)_3 \cdot 6H_2O$ | 6.30 |
| Ya5 | $Pr(NO_3)_3 \cdot 6H_2O$ | 6.30 |
| Ya6 | $Nd(NO_3)_3 \cdot 6H_2O$ | 6.20 |
| Ya7 | $Pm(NO_3)_3 \cdot 6H_2O$ | 6.18 |
| Ya8 | $Sm(NO_3)_3 \cdot 6H_2O$ | 6.03 |
| Ya9 | $Eu(NO_3)_3 \cdot 6H_2O$ | 5.99 |
| Ya10 | $Gd(NO_3)_3 \cdot 5H_2O$ | 5.62 |
| Ya11 | $Tb(NO_3)_3 \cdot 5H_2O$ | 5.82 |
| Ya12 | $Dy(NO_3)_3 \cdot 5H_2O$ | 5.51 |
| Ya13 | $Ho(NO_3)_3 \cdot 5H_2O$ | 5.46 |
| Ya14 | $Er(NO_3)_3 \cdot 5H_2O$ | 5.41 |
| Ya15 | $Tm(NO_3)_3 \cdot 5H_2O$ | 5.16 |
| Ya16 | $Yb(NO_3)_3 \cdot 3H_2O$ | 4.87 |
| Ya17 | $Lu(NO_3)_3 \cdot 3H_2O$ | 4.84 |

Examples Y-18 to Y-21

An active material powders composed of composite particles each comprising the particle obtained in step 2 and an outer coat layer formed on the surface thereof was produced by mixing 100 g of particulate powder obtained in step 2 with 2.04 of ytterbium (Yb), 2.32 g of diytterbium trioxide ($Yb_2O_3$), 2.71 g of ytterbium fluoride ($YbF_3$) or 3.10 g of ytterbium carbonate ($Yb_2(CO_3)_3$), each in powder form, by the mechanical charge technique. Electrodes Ya18 to Ya21 (electrodes Y of the invention) were produced and alkaline storage batteries YA18 to YA21 were fabricated in the same manner as in steps 4 and 5 of Example Y-1 except that the active material powders obtained in the above manner were used.

Example Y-22

Ytterbium nitrate (4.87 g) was dissolved in an aqueous solution (1,000 ml) containing 166.9 g of nickel sulfate. Following dropwise addition of aqueous ammonia, 1 M aqueous sodium hydroxide was added dropwise with vigorous stirring, followed by washing with water and drying, to give a powder composed of solid solution particles consisting of nickel hydroxide and ytterbium. An electrode Ya22 (electrode Y of the invention) was produced and an alkaline storage battery YA22 was fabricated in the same manner as in Example Y16 except that said solid solution particle powder was used in lieu of the nickel hydroxide powder.

Examples Y-23 to Y-26

Ytterbium nitrate (4.87 g) was dissolved in an aqueous solution (1,000 ml) containing 166.9 g of nickel sulfate. Following dropwise addition of aqueous ammonia, 1 M aqueous sodium hydroxide was added dropwise with vigorous stirring, followed by washing with water and drying, to give a powder composed of solid solution particles consisting of nickel hydroxide and ytterbium. Then, this solid solution particle powder was mixed with a 25% (by weight) aqueous solution of sodium hydroxide in a weight ratio of 1:10, and the mixture was heat-treated at 85° C. for 8 hours, followed by washing with water and drying at 65° C., to give a powder composed of particles each comprising the solid solution particle and an inner coat layer of a sodium-containing cobalt compound as formed on the surface of said particle. This particulate powder (100 g) was mixed with 2.04 g of ytterbium, 4.65 g of diytterbium trioxide, 2.71 g of ytterbium fluoride or 3.10 g of ytterbium carbonate, each in powder form, by the mechanical charge technique, to give an active material powder composed of composite particles. Electrodes Ya23 to Ya26 (electrodes Y of the invention) were produced and alkaline storage batteries YA23 to YA26 were fabricated in the same manner as in steps 4 and 5 of Example Y-1 except that the active material powders obtained in the above manner were used.

Comparative Example Y-1

An electrode Yb for comparison was produced and a battery YB for comparison was fabricated in the same manner as in Example Y-1 except that step 3 was omitted.

Comparative Example Y-2

A paste was prepared by kneading 100 parts by weight of nickel hydroxide, 7 parts by weight of metallic cobalt, 5 parts by weight of cobalt hydroxide, 3 parts of diyttrium trioxide (mean particle size 1 μm) and 20 parts by weight of a 1% (by weight) aqueous solution of methyl cellulose as a binder. This paste was packed into a porous base plate made of foamed nickel (porosity 95%, mean pore size 200 μm, followed by drying and pressure molding, to give an electrode Yc for comparison. Then, a battery for comparison YC was fabricated in the same manner as in Example Y-1 except that said electrode Yc for comparison was used in step 5. The procedure for making this battery was as disclosed in Japanese Kokai Tokkyo Koho H05-28992.

Comparative Example Y-3

An electrode Yd for comparison and a battery YD for comparison were respectively produced in the same manner as in Example Y-1 except that, in lieu of step 3, yttrium hydroxide was added to the particulate powder obtained in step 2 in an amount of 1 part by weight, expressed as yttrium, relative to 100 parts by weight of the nickel hydroxide in the powder obtained in step 2.

Comparative Example Y-4

An electrode Ye for comparison and a battery YE for comparison were respectively produced in the same manner as in Example Y-1 except that steps 2 and 3 were omitted and the particulate powder obtained in step 1 itself was used as the active material. The procedure for making this battery was as disclosed in Japanese Kokai Tokkyo Koho S62-234867.

Comparative Example Y-5

Ytterbium nitrate (4.87 g) was dissolved in an aqueous solution (1,000 ml) containing 166.9 g of nickel sulfate. Following dropwise addition of aqueous ammonia, 1 M aqueous sodium hydroxide was added dropwise with vigorous stirring, followed by washing with water and drying, to give a powder composed of solid solution particles consisting of nickel hydroxide and ytterbium. Then, this solid solution particle powder was mixed with a 25% (by weight) aqueous solution of sodium hydroxide in a weight ratio of 1:10, and the mixture was heat-treated at 85° C. for 8 hours, followed by washing with water and drying at 65° C., to give a powder composed of particles each comprising the solid solution particle and an inner coat layer of a sodium-containing cobalt compound as formed on the surface of said particle. An electrode Yf for comparison and a battery YF for comparison were respectively produced in the same manner as in Examples Y-23 to Y-26 except that said particulate powder was used as the active material powder.

Active material utilization efficiency of each of the non-sintered nickel electrodes Each battery was subjected to 10 charge/discharge cycles each comprising 160% charging at 0.1 C at 25° C., followed by discharge until 1.0 V at 1 C at 25° C. The active material utilization efficiency, for the 10th cycle, of the non-sintered nickel electrode used in each battery was determined. Then, each battery was 160% charged at 0.1 C at 60° C. and discharged until 1.0 V at 1 C at 25° C. and the active material utilization efficiency following high-temperature atmosphere charging was determined. The active material utilization efficiency was calculated as follows:

Active material utilization efficiency (%)=[discharge capacity (mAh)/[amount of nickel hydroxide (g)×288 (mAh/g)]]×100

The results thus obtained are shown in Table 6. In Table 6, the active material utilization efficiency values are relative indices with the active material utilization efficiency of electrode Ya1 of the invention being taken as 100.

TABLE 6

| Electrode | Inner coat layer | Active material utilization efficiency at 10th cycle in charge/discharge cycles at 25° C. | Active material utilization efficiency in charging at 60° C. |
| --- | --- | --- | --- |
| Ya1 | $Y(OH)_3$ | 100 | 70 |
| Ya2 | $Sc(OH)_3$ | 100 | 66 |
| Ya3 | $La(OH)_3$ | 100 | 67 |
| Ya4 | $Ce(OH)_3$ | 98 | 67 |
| Ya5 | $Pr(OH)_3$ | 100 | 66 |
| Ya6 | $Nd(OH)_3$ | 100 | 67 |
| Ya7 | $Pm(OH)_3$ | 99 | 67 |
| Ya8 | $Sm(OH)_3$ | 100 | 66 |
| Ya9 | $Eu(OH)_3$ | 100 | 68 |
| Ya10 | $Gd(OH)_3$ | 100 | 68 |
| Ya11 | $Tb(OH)_3$ | 99 | 67 |
| Ya12 | $Dy(OH)_3$ | 100 | 67 |
| Ya13 | $Ho(OH)_3$ | 99 | 66 |
| Ya14 | $Er(OH)_3$ | 100 | 67 |
| Ya15 | $Tm(OH)_3$ | 100 | 68 |
| Ya16 | $Yb(OH)_3$ | 100 | 68 |
| Ya17 | $Lu(OH)_3$ | 99 | 65 |
| Ya18 | Yb | 99 | 66 |
| Ya19 | $Yb_2O_3$ | 100 | 67 |
| Ya20 | $YbF_3$ | 99 | 67 |
| Ya21 | $Yb_2(CO_3)_3$ | 100 | 65 |
| Ya22 | $Yb(OH)_3$ | 100 | 67 |
| Ya23 | Yb | 99 | 67 |
| Ya24 | $Yb_2O_3$ | 100 | 68 |
| Ya25 | $YbF_3$ | 100 | 66 |
| Ya26 | $Yb_2(CO_3)_3$ | 99 | 66 |
| Yb | — | 100 | 60 |
| Yc | — | 75 | 30 |
| Yd | — | 92 | 61 |
| Ye | — | 74 | 27 |
| Yf | — | 98 | 43 |

As shown in Table 6, electrodes Ya1 to Ya26 of the invention showed high active material utilization efficiency in both cases of charging at 25° C. and charging at 60° C. Among then, electrode Ya1 of the invention showed the highest active material utilization efficiency at the time of charging at 60° C., indicating that yttrium or an yttrium compound is most preferred as the material of the outer coat layer. On the contrary, electrode Yb for comparison showed lower active material utilization efficiency at the time of charging at 60° C. as compared with electrodes Ya1 to Ya26 of the invention although, at the time of charging at 25° C., it was comparable in active material utilization efficiency to electrodes Ya1 to Ya26 of the invention. This is presumably because the outer coat layer was not formed, hence the decrease in oxygen overvoltage at the time of high-temperature charging was not suppressed to a sufficient extent. The active material utilization efficiency of electrode Yc for comparison at the time of charging at 25° C. and that at 60° C. was very low and this was presumably due to the electron conductivity-providing effect resulting from the addition of metallic cobalt and cobalt hydroxide having been lessened by the simultaneous addition of diyttrium trioxide. The low active material utilization efficiency of electrode Yd for comparison at the time of charging at 25° C. and at 60° C. as compared with electrodes Ya1 to Ya21 is presumably due to the fact that no outer coat layer was formed and the yttrium hydroxide was merely added, so that the oxygen overvoltage at the time of charging could not be increased effectively. The markedly lower active material utilization efficiency of electrodes Ye and Yf for comparison at the time of charging at 25° C. and at 60° C. as compared with electrodes Ya1 to Ya26 of the invention is presumably due to the fact that no outer coat layer was formed, hence the oxygen overvoltage at the time of charging was low and the charged electric energy could not be effectively used in charging the active material.

Relationship between the proportion of the inner coat layer relative to the sum total of the substrate particle and inner coat layer and the active material utilization efficiency at the time of high-temperature charging or the discharge capacity Non-sintered nickel electrodes Yf1 to Yf7 and alkaline storage batteries YF1 toYF7 were respectively produced in the same manner as in Example Y-1 except that, in step 1, an aqueous solution (1 liter) containing 1.31 g, 5.25 g, 7.88 g, 26.3 g, 39.4 g, 44.7 g or 52.5 g of cobalt sulfate was used in lieu of the aqueous solution (1 liter) containing 13.1 g of cobalt sulfate. For each of non-sintered nickel electrodes Yf1 to Yf7, the proportion of the inner coat layer relative to the sum total of the nickel hydroxide (substrate particle) and the inner coat layer was determined by assaying cobalt by atomic absorption analysis. As shown in Table 7, the respective proportions were found to be 0.5% by weight, 2% by weight, 3% by weight, 10% by weight, 15% by weight, 17% by weight and 20% by weight in the above-mentioned order.

TABLE 7

| Electrode | Yf1 | Yf2 | Yf3 | Ya1 | Yf4 | Yf5 | Yf6 | Yf7 |
|---|---|---|---|---|---|---|---|---|
| Amount of cobalt sulfate used (g) | 1.31 | 5.25 | 7.88 | 13.1 | 26.3 | 39.4 | 44.7 | 52.5 |
| Proportion of the inner coat layer relative to the sum total of the composite particle and the inner coat layer (% by weight) | 0.5 | 2 | 3 | 5 | 10 | 15 | 17 | 20 |

Figure 4:
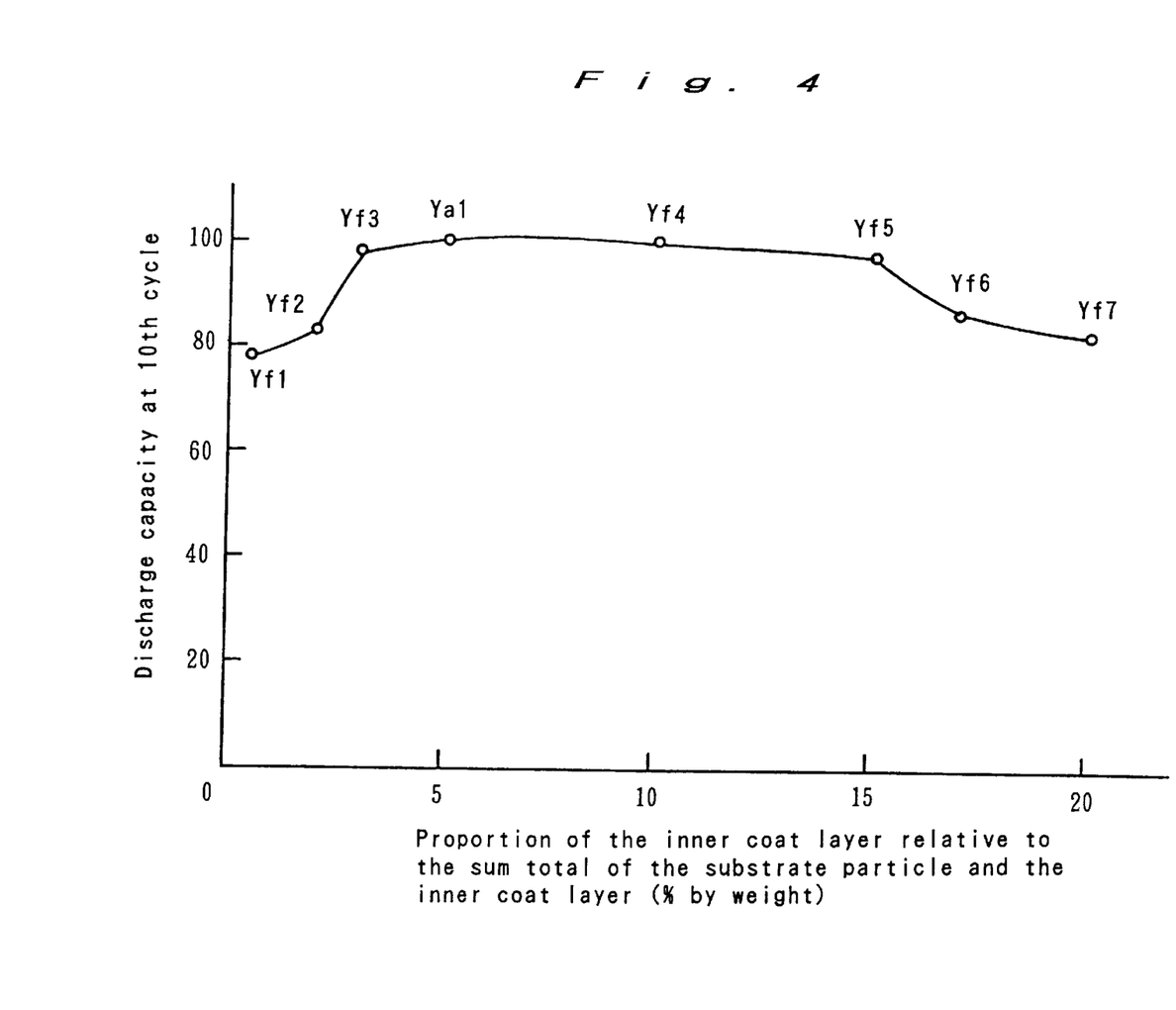
FIG. 4 is a graphic representation of the relationship between the proportion of the inner coat layer relative to the sum total of the substrate particle plus the inner coat layer and the discharge capacity.

Then, each battery was subjected to the same charge/discharge test as mentioned above (10 cycles of charge and discharge at 25° C.), and the discharge capacity, for the 10th charge/discharge at 25° C., of the non-sintered nickel electrode used in each battery was determined. The results thus obtained are shown in FIG. 4. FIG. 4 is a graphic representation of the relationship between the proportion of the inner coat layer relative to the sum total of the substrate particle and inner coat layer and the discharge capacity, the ordinate denoting the discharge capacity in the 10th cycle of charge/discharge at 25° C. and the abscissa denoting the proportion (% by weight) of the inner coat layer relative to the sum total of the substrate particle and inner coat layer. In FIG. 4, there is also shown the discharge capacity of electrode Ya1 of the invention following charging at 25° C. in the 10th cycle. The discharge capacity data shown in FIG. 1 (ordinate) are relative indices with the discharge capacity of electrode Ya1 of the invention following charging at 25° C. in the 10th cycle being taken as 100.

From FIG. 4, it is seen that, for obtaining a non-sintered nickel electrode showing great discharge capacity, the proportion of the inner coat layer relative to sum total of the substrate particle and inner coat layer should preferably be 3 to 15% by weight. It has been separately established that, in cases where the outer coat layer is mace of ytterbium hydroxide, the proportion of the inner coat layer relative to the sum total of the substrate particle and inner coat layer should preferably be 3 to 15% by weight.

Relationship between the proportion of yttrium in the outer coat layer relative to the nickel hydroxide in the substrate particle and the active material utilization efficiency at the time of high-temperature charging or the discharge capacity Non-sintered nickel electrodes Ye1 to Ye7 and alkaline storage batteries YE1 to YE7 were respectively produced in the same manner as in Example Y-1 except that, in step 3, an aqueous solution (1 liter) containing 0.079 g, 0.13 g, 1.31 g, 7.86 g, 13.1 g, 15.7 g or 20.9 g of yttrium sulfate was used in lieu of the aqueous solution (1 liter) containing 2.62 g of yttrium sulfate. For each of non-sintered nickel electrodes Ye1 to Ye7, the proportion of yttrium in the outer coat layer relative to the nickel hydroxide in the substrate particle was determined by assaying yttrium by inductively coupled plasma atomic emission spectrometry. As shown in Table 8, the respective proportions were, in the above-mentioned order, 0.03% by weight, 0.05% by weight, 0.5% by weight, 3% by weight, 5% by weight, 6% by weight and 8% by weight.

TABLE 8

| Electrode | Ye1 | Ye2 | Ye3 | Ya1 | Ye4 | Ye5 | Ye6 | Ye7 |
|---|---|---|---|---|---|---|---|---|
| Amount of yttrium sulfate used (g) | 0.079 | 0.13 | 1.31 | 2.62 | 7.86 | 13.1 | 15.7 | 20.9 |
| Proportion of yttrium relative to nickel hydroxide (% by weight) | 0.03 | 0.05 | 0.5 | 1 | 3 | 5 | 6 | 8 |

Then, each battery was subjected to the same charge/discharge test as mentioned above (10 cycles of charge and discharge at 25° C., followed by one cycle of charge at 60° C. and discharge at 25° C.), and the active material utilization efficiency at the time of charging at 60° C. and the discharge capacity in the 10th charge/discharge cycle at 25° C. were determined for the non-sintered nickel electrode used in each battery. The respective results thus obtained are shown in FIG. 5 and FIG. 6.

Figure 5:
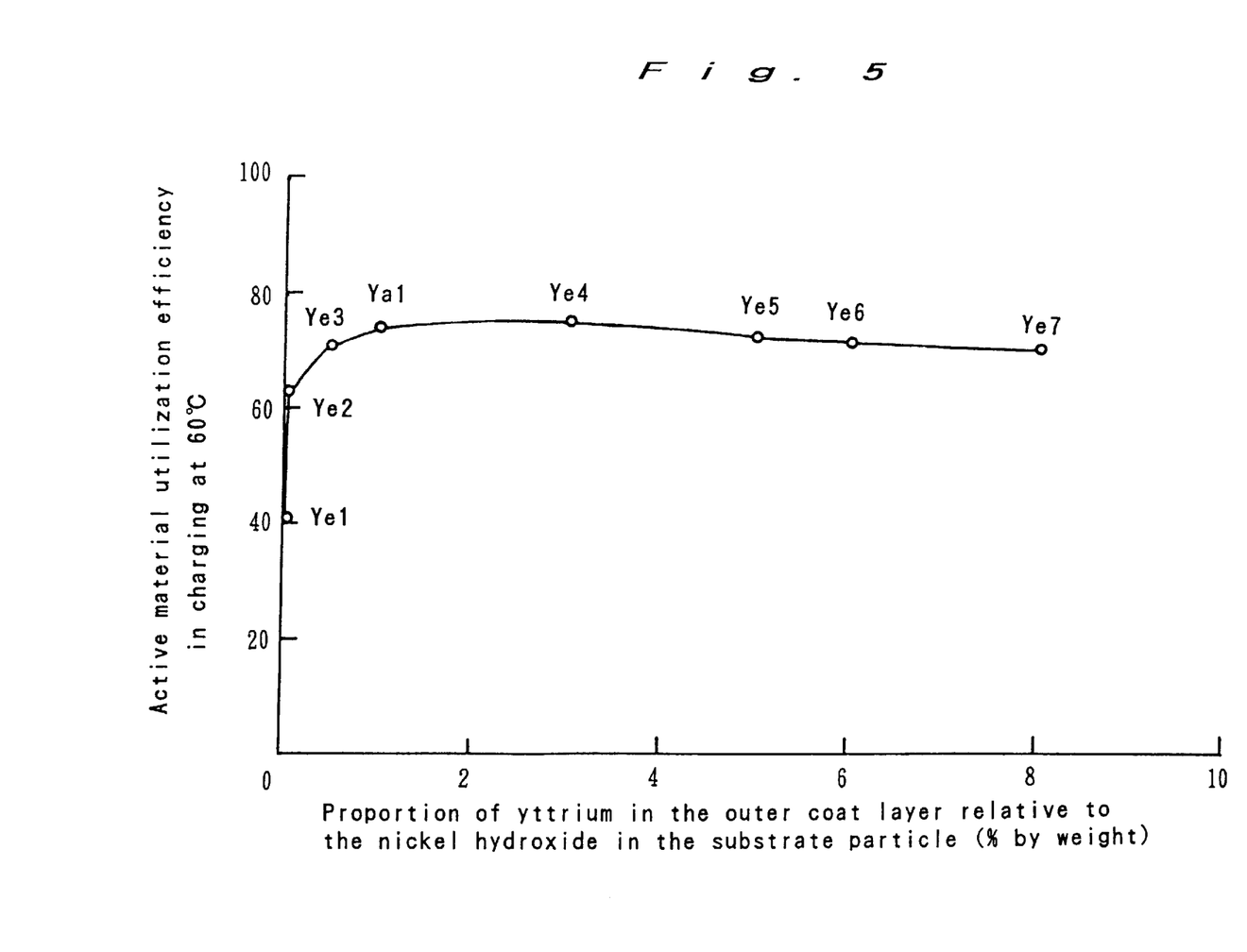
FIG. 5 is a graphic representation of the relationship between the proportion of yttrium in the outer coat layer relative to the nickel hydroxide in substrate particles and the active material utilization efficiency at the time of high-temperature charging.

FIG. 5 is a graphic representation of the relationship between the proportion of yttrium in the outer coat layer relative to the nickel hydroxide in the substrate particle and the active material utilization efficiency at the time of high-temperature charging, the ordinate denoting the active material utilization efficiency at the time of charging at 60° C. and the abscissa denoting the proportion (% by weight) of yttrium in the outer coat layer relative to the nickel hydroxide in the substrate particle. In FIG. 5, the active material utilization efficiency of electrode Ya1 of the invention at the time of charging at 60° C. is also shown. The active material utilization efficiency data shown in FIG. 5 (ordinate) are relative indices with the active material utilization efficiency of electrode Ya1 of the invention in the 10th cycle of charge/discharge at 25° C. being taken as 100.

From FIG. 5, it is seen that, for obtaining a non-sintered nickel electrode showing high active material utilization efficiency at the time of high-temperature charging, the proportion of yttrium in the outer coat layer relative to the nickel hydroxide in the substrate particle should preferably be not less than 0.05% by weight.

Figure 6:
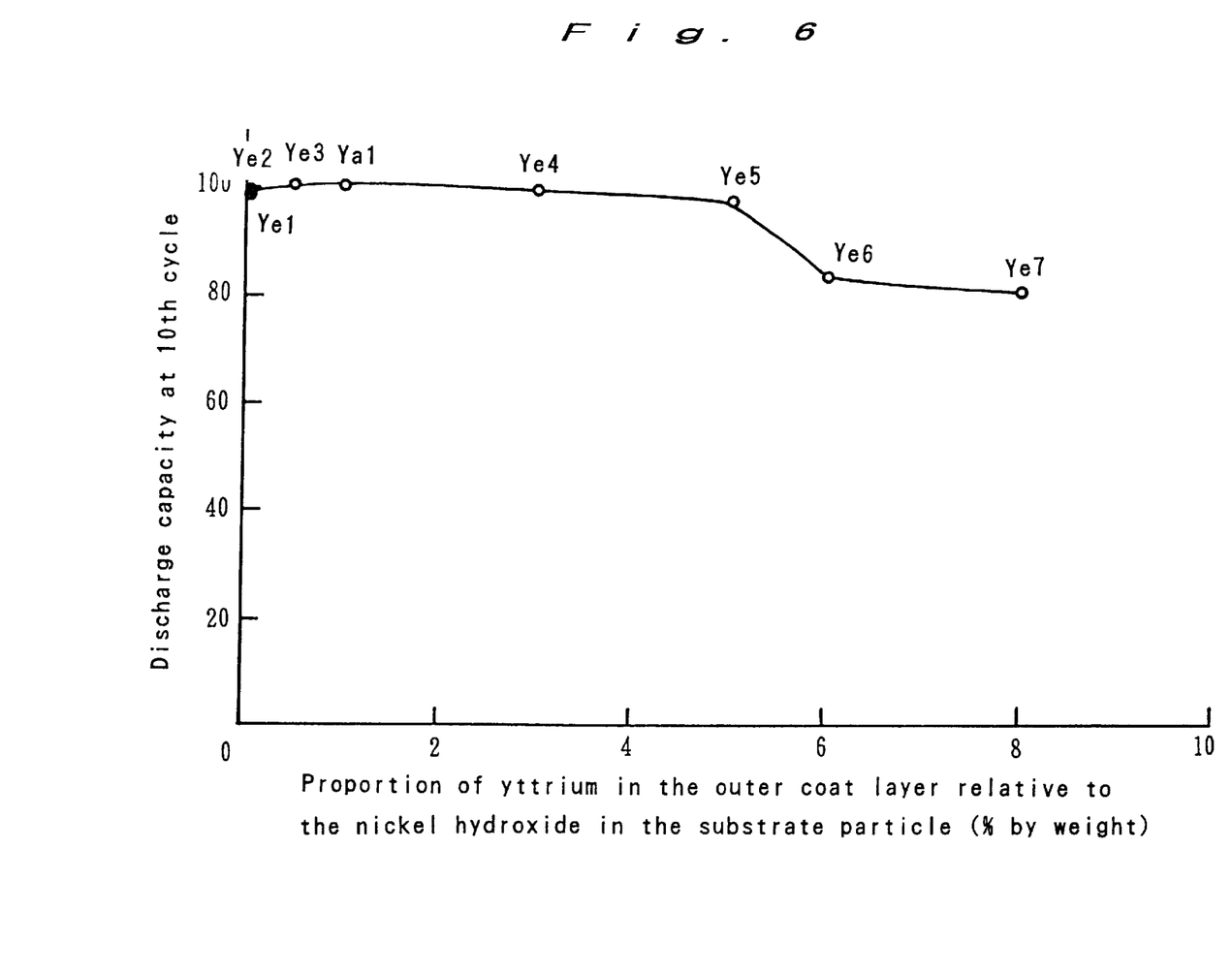
FIG. 6 is a graphic representation of the relationship between the proportion of yttrium in the outer coat layer relative to the nickel hydroxide in substrate particles and the discharge capacity.

FIG. 6 is a graphic representation of the relationship between the proportion of yttrium in the outer coat layer relative to the nickel hydroxide in the substrate particle and the discharge capacity, the ordinate denoting the discharge capacity following charging at 25° C. in the 10th cycle and the abscissa denoting the proportion (% by weight) of yttrium in the outer coat layer relative to the nickel hydroxide in the substrate particle. In FIG. 6, there is also shown the discharge capacity of electrode Ya1 of the invention following charging at 25° C. in the 10th cycle. The discharge capacity ata shown in FIG. 6 (ordinate) are relative indices with the discharge capacity of electrode Ya1 of the invention following charging at 25° C. in the 10th cycle being taken as 100.

From FIG. 6, it is seen that, for obtaining a non-sintered nickel electrode showing great discharge capacity, the proportion of yttrium in the outer coat layer relative to the nickel hydroxide in the substrate particle should preferably be not more than 5% by weight.

As seen from FIG. 5 and FIG. 6, it is preferred that the proportion of yttrium in the outer coat layer relative to the nickel hydroxide in the substrate particle should be 0.05 to 5% by weight. It has also been established separately that, in forming the outer coat layer using ytterbium hydroxide, too, the proportion of ytterbium in the outer coat layer relative to the nickel hydroxide in the substrate particle should preferably be 0.05 to 5% by weight. For scandium and lanthanoids, the same tendency was observed.

While, in the above examples, single-component particles made of nickel hydroxide were used as substrate particles, it has been separately established that the same excellent effects as mentioned above can be obtained by using solid solution particles derived from nickel hydroxide and at least one element selected from among cobalt, zinc, cadmium, calcium, manganese, magnesium, bismuth, aluminum, lanthanoids and yttrium as substrate particles.

The present invention thus provides non-sintered nickel electrodes for alkaline storage batteries which can express high active material utilization efficiency not only at the time of charging at ordinary temperature but also at the time of charging in a high-temperature atmosphere.

What is claimed is:

1. A non-sintered nickel electrode for an alkaline storage battery which comprises an active material powder consisting essentially of composite particles each composed of a substrate particle containing nickel hydroxide, an inner coat layer covering said substrate particle and comprising yttrium, scandium or a lanthanoid, or an yttrium, scandium or lanthanoid compound, and an outer coat layer covering said inner coat layer and consisting essentially of cobalt or a cobalt compound.

2. The non-sintered nickel electrode for an alkaline storage battery according to claim 1, wherein said substrate particle is a solid solution particle composed of nickel hydroxide and at least one element selected from among cobalt, zinc, cadmium, calcium, manganese, magnesium, bismuth, aluminum, lanthanoids and yttrium.

3. The non-sintered nickel electrode for an alkaline storage battery according to claim 1, wherein said yttrium, scandium or lanthanoid compound is a hydroxide, oxide, carbonate or fluoride.

4. The non-sintered nickel electrode for an alkaline storage battery according to claim 1, wherein said cobalt compound is cobalt monoxide, cobalt hydroxide, cobalt oxyhydroxide or a sodium-containing cobalt compound.

5. The non-sintered nickel electrode for an alkaline storage battery according to claim 1, wherein the proportion of the yttrium, scandium or lanthanoid in said inner coat layer relative to the nickel hydroxide in said substrate particle is 0.05 to 5% by weight.

6. The non-sintered nickel electrode for an alkaline storage battery according to claim 1, *herein the proportion of said outer coat layer relative to said composite particle is 3 to 15% by weight.

7. An alkaline storage battery which comprises, as a positive electrode, the non-sintered nickel electrode for an alkaline storage battery according to any of claim 1.

8. The alkaline storage battery according to claim 7, wherein a negative electrode is a hydrogen-absorbing alloy electrode, a cadmium electrode or a zinc electrode.

9. A non-sintered nickel electrode for an alkaline storage battery which comprises an active material powder consisting essentially of composite particles each composed of a substrate particle containing nickel hydroxide, an inner coat layer covering said substrate particle and consisting essentially of cobalt or a cobalt compound, and an outer coat layer covering said inner coat layer and comprising yttrium, scandium or a lanthanoid, or an yttrium, scandium or lanthanoid compound.

10. The non-sintered nickel electrode for an alkaline storage battery according to claim 9, wherein said substrate particle is a solid solution particle composed of nickel hydroxide and at least one element selected from among cobalt, zinc, cadmium, calcium, manganese, magnesium, bismuth, aluminum, lanthanoids and yttrium.

11. The non-sintered nickel electrode for an alkaline storage battery according to claim 9, wherein said cobalt compound is cobalt monoxide, cobalt hydroxide, cobalt oxyhydroxide or a sodium-containing cobalt compound.

12. The non-sintered nickel electrode for an alkaline storage battery according to claim 9, wherein said yttrium, scandium or lanthanoid compound is a hydroxide, oxide, carbonate or fluoride.

13. The non-sintered nickel electrode for an alkaline storage battery according to claim 9, wherein the proportion of the yttrium, scandium or lanthanoid in said outer coat layer relative to the nickel hydroxide in said substrate particle is 0.05 to 5% by weight.

14. The non-sintered nickel electrode for an alkaline storage battery according to claim 9, wherein the proportion of the inner coat layer relative to the sum total of said substrate particle and said inner coat layer is 3 to 15% by weight.

15. A non-sintered nickel electrode for an alkaline storage battery which comprises an active material powder consisting essentially of composite particles each composed of a substrate particle containing nickel hydroxide, an inner coat layer covering said substrate particle consisting essentially of yttrium, scandium or a lanthanoid, or an yttrium, scandium or lanthanoid compound, and an outer coat layer covering said inner coat layer and consisting essentially of cobalt or a cobalt compound.

16. The non-sintered nickel electrode for an alkaline storage battery according to claim 15, wherein the inner coat layer consists of yttrium, scandium or a lanthanoid, or an yttrium, scandium or lanthanoid compound, wherein the outer coat layer consists of cobalt or a cobalt compound, and wherein the inner coat layer and the outer coat layer may include impurities.

17. The non-sintered nickel electrode for an alkaline storage battery according to claim 16, wherein the cobalt compound may contain sodium and is selected from the group consisting of cobalt monoxide, cobalt hydroxide, cobalt oxyhydroxide, $CoHO_2$, $Co_3O_4$ and mixtures thereof.

18. The non-sintered nickel electrode for an alkaline storage battery according to claim 17,
wherein the yttrium compound is selected from the group consisting of yttrium hydroxide, diyttrium trioxide, yttrium carbonate and yttrium fluoride,
wherein the scandium compound is selected from the group consisting of $(Sc(OH)_3$, and $Sc_2O_3$, and wherein the lanthanoid compound is selected from the group consisting of $La(OH)_3$, $Ce(OH)_3$, $Pr(OH)_3$, $Nd(OH)_3$, $Pm(OH)_3$, $Eu(OH)_3$, $Gd(OH)_3$, $Tb(OH)_3$, $Dy(OH)_3$, $Ho(OH)_3$, $Er(OH)_3$, $Tm(OH)_3$, $La_2O_3$, $CeO_2$, $Pr_6O_{11}$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$, $Lu_2O_3$, $La_2(CO_3)_3$, $Ce_2(CO_3)_3$, $Nd_2(CO_3)_3$, $Sm_2(CO_3)_3$, $LaF_3$, $CeF_3$, $PrF_3$, $NdF_3$, $SmF_3$, $GdF_3$, $TbF_3$, $DyF_3$, $ErF_3$, $YbF_3$, and $HoF_3$.

19. A non-sintered nickel electrode for an alkaline storage battery which comprises an active material powder consisting essentially of composite particles each composed of a substrate particle containing nickel hydroxide, an inner coat layer covering said substrate particle consisting essentially of cobalt or a cobalt compound, and an outer coat layer covering said inner coat layer consisting essentially of yttrium, scandium or a lanthanoid, or an yttrium, scandium or lanthanoid compound.

20. The non-sintered nickel electrode for an alkaline storage battery according to claim 19, wherein the inner coat layer consists of cobalt or a cobalt compound, wherein the outer coat layer consists of yttrium, scandium or a lanthanoid, or an yttrium, scandium or lanthanoid compound, and wherein the inner coat layer and the outer coat layer may include impurities.

21. The non-sintered nickel electrode for an alkaline storage battery according to claim 20, wherein the cobalt compound may contain sodium and is selected from the group consisting of cobalt monoxide, cobalt hydroxide, cobalt oxyhydroxide, $CoHO_2$, $Co_3O_4$ and mixtures thereof.

22. The non-sintered nickel electrode for an alkaline storage battery according to claim 21, wherein the yttrium compound is selected from the group consisting of yttrium hydroxide, diyttrium trioxide, yttrium carbonate and yttrium fluoride, wherein the scandium compound is selected from the group consisting of $(Sc(OH)_3$, and $Sc_2O_3$, and wherein the lanthanoid compound is selected from the group consisting of $La(OH)_3$, $Ce(OH)_3$, $Pr(OH)_3$, $Nd(OH)_3$, $Pm(OH)_3$, $Eu(OH)_3$, $Gd(OH)_3$, $Tb(OH)_3$, $Dy(OH)_3$, $Ho(OH)_3$, $Er(OH)_3$, $Tm(OH)_3$, $La_2O_3$, $CeO_2$, $Pr_6O_{11}$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$, $Lu_2O_3$, $La_2(CO_3)_3$, $Ce_2(CO_3)_3$, $Nd_2(CO_3)_3$, $Sm_2(CO_3)_3$, $LaF_3$, $CeF_3$, $PrF_3$, $NdF_3$, $SmF_3$, $GdF_3$, $TbF_3$, $DyF_3$, $ErF_3$, $YbF_3$, and $HoF_3$.

* * * * *